(12) United States Patent
    Kowase

(10) Patent No.:    US 12,609,244 B2
(45) Date of Patent:      Apr. 21, 2026

(54) LAMINATED CERAMIC CAPACITOR HAVING INTRA-SHELL PORES IN CORE-SHELL CERAMIC GRAINS AND METHOD OF MANUFACTURING THE SAME

(71) Applicant: TAIYO YUDEN CO., LTD., Tokyo (JP)

(72) Inventor: Yusuke Kowase, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 100 days.

(21) Appl. No.: 18/649,758

(22) Filed:    Apr. 29, 2024

(65)       Prior Publication Data

US 2024/0404753 A1    Dec. 5, 2024

(30)     Foreign Application Priority Data

May 30, 2023    (JP) ................................. 2023-089024

(51) Int. Cl.
    *H01G 4/12*       (2006.01)
    *H01G 4/30*       (2006.01)
(52) U.S. Cl.
    CPC ............. *H01G 4/1227* (2013.01); *H01G 4/30* (2013.01)

(58) Field of Classification Search
    None
    See application file for complete search history.

(56)       References Cited

U.S. PATENT DOCUMENTS

| | | | |
|---|---|---|---|
| 6,614,644 B2 * | 9/2003 | Chazono .............. | H01G 4/1209 |
| | | | 361/312 |
| 8,320,103 B2 * | 11/2012 | Yao ..................... | C04B 35/6261 |
| | | | 361/321.5 |
| 2008/0266751 A1 * | 10/2008 | Yamazaki ......... | C04B 35/62815 |
| | | | 361/321.4 |
| 2022/0157527 A1 * | 5/2022 | Yun ..................... | H01G 4/1227 |

FOREIGN PATENT DOCUMENTS

JP        2014-090119 A     5/2014

* cited by examiner

*Primary Examiner* — Eric W Thomas
(74) *Attorney, Agent, or Firm* — CUSHMAN PARTNERS, LLC

(57)         ABSTRACT

One object is to improve the insulation reliability of a laminated ceramic capacitor. The body of a laminated ceramic capacitor according to one embodiment includes a first internal electrode layer, a second internal electrode layer, and a ceramic layer. The ceramic layer is disposed between the first internal electrode layer and the second internal electrode layer and contains crystal grains of ceramic material. The crystal grains each include a core portion and a shell portion covering the core portion. The shell portion includes one or more intra-shell pores.

6 Claims, 9 Drawing Sheets

LAMINATED CERAMIC CAPACITOR HAVING INTRA-SHELL PORES IN CORE-SHELL CERAMIC GRAINS AND METHOD OF MANUFACTURING THE SAME

CROSS-REFERENCE TO RELATED APPLICATIONS

This application is based on and claims the benefit of priority from Japanese Patent Application Serial No. 2023-089024 (filed on May 30, 2023), the contents of which are hereby incorporated by reference in their entirety.

TECHNICAL FIELD

The disclosure herein relates mainly to a laminated ceramic capacitor and a method of manufacturing a laminated ceramic capacitor. The disclosure herein also relates to a circuit module with the laminated ceramic capacitor and an electronic device with the circuit module.

BACKGROUND

Laminated ceramic capacitors are installed in various electronic devices. A laminated ceramic capacitor has a capacitance-generating portion that includes a dielectric layer and internal electrode layers that sandwich the dielectric layer. It is known that various characteristics of a laminated ceramic capacitor can be improved by adding rare earth elements to the dielectric layer, which is mainly composed of barium titanate. For example, Japanese Patent Application Publication No. 2014-090119 discloses that the capacitance and high-temperature load life of a laminated ceramic capacitor can be improved by adding rare earth elements to the dielectric layer, which is mainly composed of barium titanate.

As the content of rare earth elements in the dielectric layer increases, oxygen defects are more likely to occur in the dielectric layer. When voltage is applied between the internal electrodes during use of a laminated ceramic capacitor, oxygen defects in the dielectric layer migrate from the inside of the dielectric layer toward the internal electrode layer (negative electrode) and accumulate at the interface between the dielectric layer and the internal electrode layer. The oxygen defects accumulated at the interface between the dielectric layer and the internal electrode layer increase the leakage current and thus cause a decrease in the insulation reliability of the capacitor.

SUMMARY

It is an object of the present disclosure to solve or alleviate at least part of the drawback mentioned above. One of the more particular objects of the disclosure is to improve the insulation reliability of laminated ceramic capacitors. One of the more particular objects of the disclosure is to improve the insulation reliability of the laminated ceramic capacitor by inhibiting the migration of oxygen defects occurring in the dielectric layer and thus inhibiting the accumulation of the oxygen defects at the interface between the dielectric layer and the internal electrode layer.

Other objects of the disclosure will be made apparent through the entire description in the specification. The invention disclosed herein may also address drawbacks other than that grasped from the above description. When an advantageous effect of an embodiment is described herein, the advantageous effect suggests an object of the invention corresponding to the embodiment.

The various inventions disclosed herein may be collectively referred to as "the invention". The body of a laminated ceramic capacitor according to one aspect of the disclosure includes a first internal electrode layer, a second internal electrode layer, and a ceramic layer. The ceramic layer is disposed between the first internal electrode layer and the second internal electrode layer and contains crystal grains of ceramic material. The crystal grains each include a core portion and a shell portion covering the core portion. The shell portion includes one or more intra-shell pores.

Advantageous Effects

According to one embodiment of the disclosure, the insulation reliability of laminated ceramic capacitors can be improved.

DESCRIPTION OF THE PREFERRED EMBODIMENTS

Figure 1:
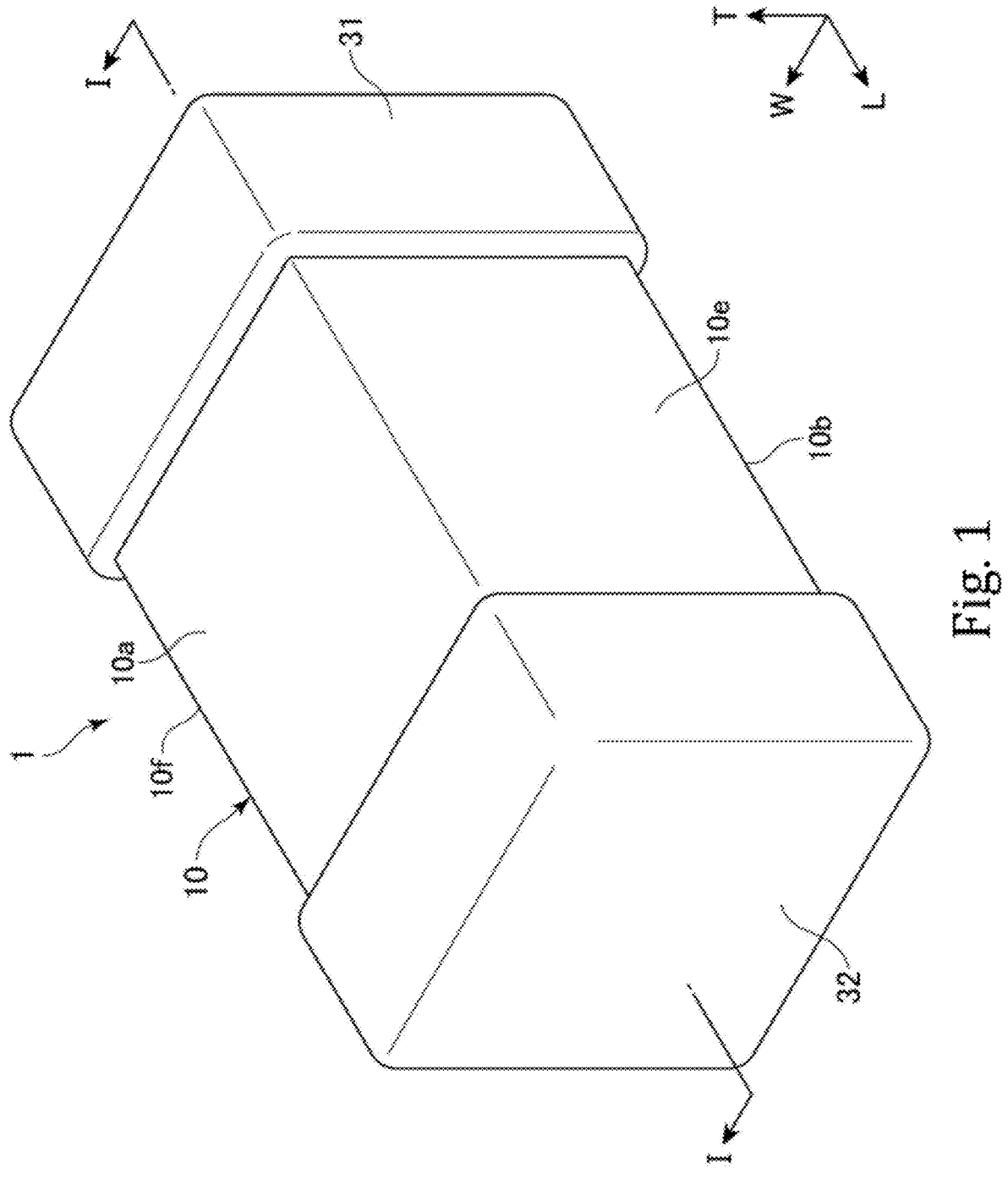
FIG. 1 is a perspective view schematically showing a laminated ceramic capacitor according to one embodiment of the disclosure.

Various embodiments of the disclosure will be described hereinafter with reference to the appended drawings. Throughout the drawings, the same components are denoted by the same or like reference numerals. For convenience of explanation, the drawings are not necessarily drawn to scale. The following embodiments of the disclosure do not limit the scope of the claims. The elements included in the following embodiments are not necessarily essential to solve the problem addressed by the invention.

For convenience of explanation, each of the drawings may show the L axis, the W axis, and the Taxis orthogonal to one another. In this specification, the dimensions, arrangement, shape, and other features of each component of a laminated ceramic capacitor 1 may be described with reference to the L, W, and T axes.

(1) LAMINATED CERAMIC CAPACITOR 1

(1-1) Basic Structure of Laminated Ceramic Capacitor 1

Figure 2:
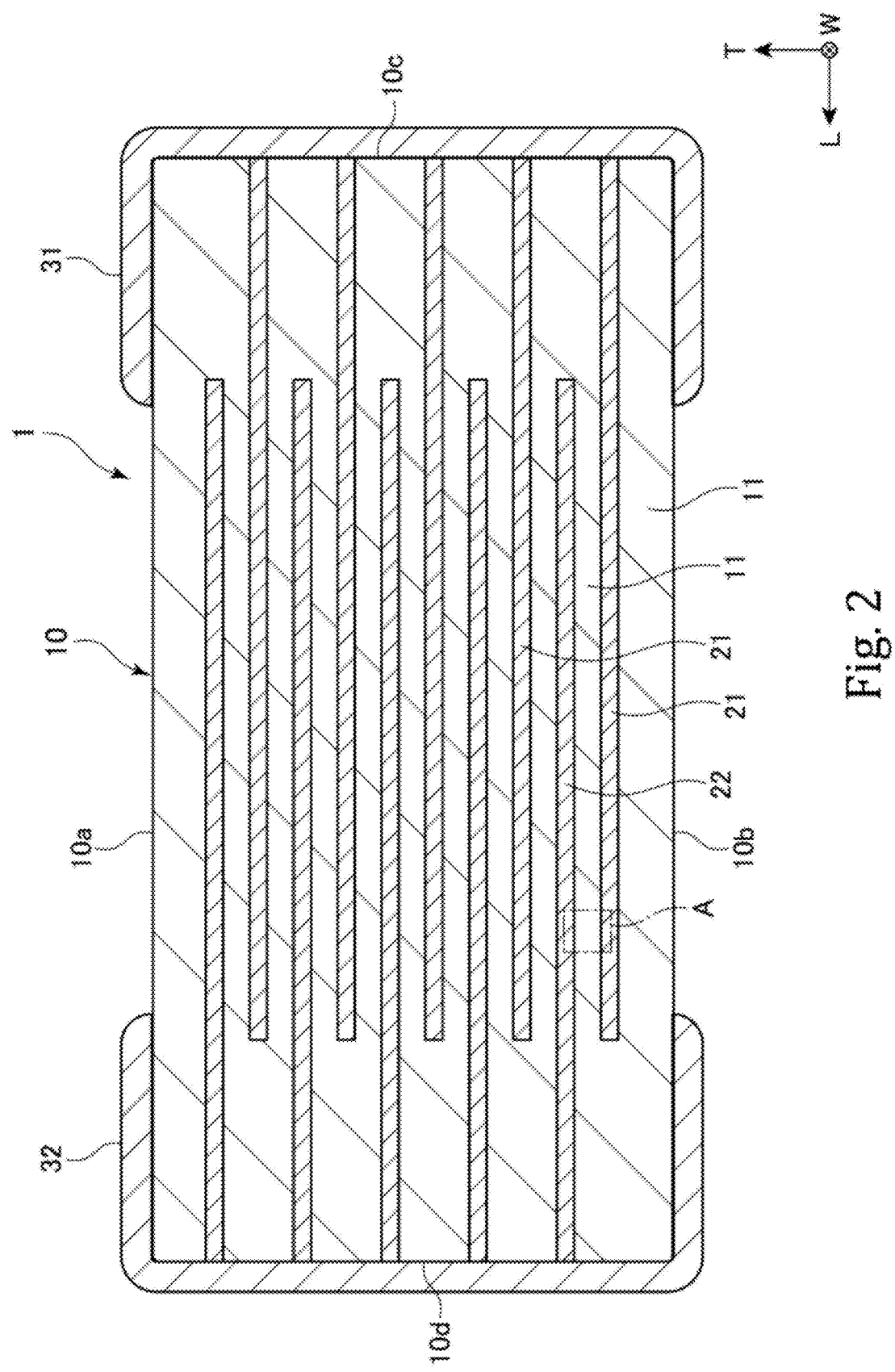
FIG. 2 is a sectional view schematically showing a section of the capacitor of FIG. 1 cut along the line I-I.

Referring to FIGS. 1 and 2, a description will now be given of the basic structure of a laminated ceramic capacitor 1 according to the first embodiment. The laminated ceramic capacitor 1 is an example of a capacitor recited in the claims. FIG. 1 is a perspective view showing the laminated ceramic capacitor 1 according to the first embodiment. FIG. 2 is a sectional view schematically showing a section of the laminated ceramic capacitor 1 cut along the line I-I.

The laminated ceramic capacitor 1 has a body 10, a first external electrode 31 and a second external electrode 32 provided on the body 10. The first external electrode 31 is spaced apart from the second external electrode 32. In the example shown in FIG. 2, the first external electrode 31 is spaced apart from the second external electrode 32 in the L-axis direction.

The body 10 includes a plurality of ceramic layers 11, a plurality of first internal electrode layers 21, and a plurality of second internal electrode layers 22. A ceramic layer 11 is located between a first internal electrode layer 21 and a second internal electrode layer 22 adjacent to the first internal electrode layer 21. In this specification, the first internal electrode layers 21 and the second internal electrode layers 22 may be referred to collectively as "the internal electrode layers" when it is not necessary to distinguish the first internal electrode layers 21 and the second internal electrode layers 22 from each other.

The body 10 has a top surface 10a, a bottom surface 10b, a first end surface 10c, a second end surface 10d, a first side surface 10e, and a second side surface 10f. The outer surface of the body 10 is defined by the top surface 10a, the bottom surface 10b, the first end surface 10c, the second end surface 10d, the first side surface 10e, and the second side surface 10f.

The top surface 10a and the bottom surface 10b form the opposite ends of the body 10 in the height direction (T-axis direction). In other words, the top surface 10a and the bottom surface 10b are opposed to each other in the T-axis direction. The first end surface 10c and the second end surface 10d form the opposite ends of the body 10 in the length direction (L-axis direction). In other words, the first end surface 10c and the second end surface 10d are opposed to each other in the L-axis direction. The first side surface 10e and the second side surface 10f form the opposite ends of the body 10 in the width direction (W-axis direction). In other words, the first side surface 10e and the second side surface 10f are opposed to each other in the W-axis direction. The top surface 10a and the bottom surface 10b are separated from each other by a distance equal to the height of the body 10, the first end surface 10c and the second end surface 10d are separated from each other by a distance equal to the length of the body 10, and the first side surface 10e and the second side surface 10f are separated from each other by a distance equal to the width of the body 10.

In one aspect, the body 10 may be configured to have a rectangular parallelepiped shape. The term "rectangular parallelepiped" or "rectangular parallelepiped shape" used herein is not intended to mean solely "rectangular parallelepiped" in a mathematically strict sense. As described later, the corners and/or edges of the body 10 may be rounded. The dimensions and the shape of the body 10 are not limited to those specified herein.

The body 10 is composed of the ceramic layers 11, the first internal electrode layers 21, and the second internal electrode layers 22 stacked together along the lamination direction. In the illustrated embodiment, the ceramic layers 11, the first internal electrode layers 21, and the second internal electrode layers 22 are stacked together along the T-axis direction. The lamination direction may be along the T axis, as shown in the drawings, or may be along the L or W axis. The ceramic layers 11 located at the opposite ends in the lamination direction may be referred to as cover layers.

Each of the first internal electrode layers 21 has one end led toward the outside of the body 10. The first internal electrode layer 21 is connected to the first external electrode 31 provided on the surface of the body 10. Each of the second internal electrode layers 22 has one end led toward the outside of the body 10. The second internal electrode layer 22 is connected to the second external electrode 32 provided on the surface of the body 10. In the illustrated embodiment, the first internal electrode layer 21 is led from one end in the L-axis direction toward the outside of the body 10 and connected to the first external electrode 31 at one end of the body 10 in the L-axis direction. The second internal electrode layer 22 is led from the other end in the L-axis direction toward the outside of the body 10 and connected to the second external electrode 32 at the other end of the body 10 in the L-axis direction. In the example shown in FIG. 2, the first and second internal electrode layers 21 and 22 are led out to the first and second end surfaces 10c and 10d, respectively, but the first and second internal electrode layers 21 and 22 can be led out through various surfaces of the body 10 in accordance with the locations and the shapes of the first and second external electrodes 31 and 32. For example, if both the first and second external electrodes 31 and 32 are located on the bottom surface 10b, both the first and second internal electrode layers 21 and 22 are led out through the bottom surface. The first and second external electrodes 31 and 32 may be located on any of the surfaces of the body 10 as long as they are separated from each other.

When voltage is applied between the first and second external electrodes 31 and 32, capacitance is generated between the first and second internal electrode layers 21 and 22.

FIG. 2 shows five each of the first and second internal electrode layers 21 and 22 for simplicity of illustration, but the laminated ceramic capacitor 1 may include any number of layers stacked together. The laminated ceramic capacitor 1 may include, for example, 300 to 1000 each of the first and second internal electrode layers 21 and 22. In other words, the number of laminations in the laminated ceramic capacitor 1 may be 300 to 1000.

The laminated ceramic capacitor 1 may be mounted on an electronic circuit board. The electronic circuit board having the laminated ceramic capacitor 1 mounted thereon may be referred to as a circuit module. Various electronic components other than the laminated ceramic capacitor 1 may also be mounted on the circuit module. The circuit module may be installed in various electronic devices. The electronic devices in which the circuit module can be installed include smartphones, tablets, game consoles, electrical components of automobiles, servers, and various other electronic devices.

In one aspect, the laminated ceramic capacitor 1 has a dimension in the L axis direction (length) of 0.2 mm to 4.5 mm, a dimension in the W axis direction (width) of 0.1 mm to 3.2 mm, and a dimension in the Taxis direction (height) of 0.1 mm to 3.2 mm. In one aspect, the length of the laminated ceramic capacitor 1 may be larger than the width thereof. In one aspect, the height of the laminated ceramic capacitor 1 may be larger than the width thereof. In one aspect, the width of the laminated ceramic capacitor 1 may be larger than the length thereof.

(1-2) Ceramic Layers 11

(1-2-1) Composition of Ceramic Layers 11

The ceramic layers 11 contain as a main component thereof an oxide of ceramic material represented by the chemical formula $ABO_3$. The oxide may have a perovskite structure. A component that is at least 50 wt % of the ceramic layers 11 with reference to the total mass of the ceramic layers 11 can be regarded as the main component of the ceramic layers 11. When the ceramic layers 11 contain 50 wt % or more the oxide represented by the chemical formula $ABO_3$, the ceramic layers 11 can be considered to contain the oxide represented by the chemical formula $ABO_3$ as the main component thereof. The ceramic layers 11 preferably contain at least 60 wt %, 70 wt %, 80 wt %, or 90 wt % the oxide represented by the chemical formula $ABO_3$. The main component oxide of the ceramic layers 11 may have oxygen defects. These oxygen defects may occur at an A site of the main component oxide of the ceramic layers 11. If oxygen defects occur at the A site of the main component oxide of the ceramic layers 11, the composition formula of the main component oxide of the ceramic layers 11 can be expressed as $A_\alpha BO_{3-\beta}$. When the main component oxide of the ceramic layers 11 is expressed by the composition formula $A_\alpha BO_{3-\beta}$, for example, the possible range for $\alpha$ can be $0.98 \leq \alpha \leq 1.01$, and the possible range for $\beta$ can be $0 \leq \beta \leq 0.05$.

In the chemical formula $ABO_3$, "A" is at least one element selected from the group consisting of Ba (barium), Sr (strontium), Ca (calcium), and Mg (magnesium). In the chemical formula $ABO_3$, "B" is at least one element selected from the group consisting of Ti (titanium), Zr (zirconium), and Hf (hafnium). When the oxide represented by the chemical formula $ABO_3$ has a perovskite structure, elements "A" and "B" are located at the A site and the B site of the perovskite structure, respectively. Examples of the oxides contained in the ceramic layers 11 as a main component include $BaTiO_3$ (barium titanate), $CaZrO_3$ (calcium zirconate), $CaTiO_3$ (calcium titanate), $SrTiO_3$ (strontium titanate), and $MgTiO_3$ (magnesium titanate).

The oxide contained in the ceramic layers 11 as the main component may be an oxide represented by the chemical formula $Ba_{1-x-y}Ca_xSr_yTi_{1-z}Zr_zO_3$ ($0 \leq x \leq 1$, $0 \leq y \leq 1$, $0 \leq z \leq 1$). Examples of this type of oxide include strontium barium titanate, calcium barium titanate, barium zirconate, barium zirconate titanate, calcium zirconate titanate, and calcium barium zirconate titanate.

The ceramic layers 11 may contain one or more additive elements in addition to the main component oxide. In one aspect, the one or more additive elements contained in the ceramic layers 11 are selected from the group consisting of Fe (iron), Ni (nickel), Mo (molybdenum), Nb (niobium), Ta (tantalum), W (tungsten), Mg (magnesium), Mn (manganese), V (vanadium), and Cr (chromium). The ceramic layers 11 may contain two or more of the above additive elements.

The ceramic layers 11 may contain oxides of rare earth elements in addition to the main component oxide. The oxides of rare earth elements contained in the ceramic layers 11 may be oxides of at least one rare earth element selected from the group consisting of Y (yttrium), Sm (samarium), Eu (europium), Gd (gadolinium), Tb (terbium), Dy (dysprosium), Ho (holmium), Er (erbium), Tm (thulium), and Yb (ytterbium). The ceramic layers 11 may contain oxides of two or more rare earth elements.

The ceramic layers 11 may contain yet another type of oxide. The ceramic layer 11 may contain oxides of at least one element selected from the group consisting of, for example, Co (cobalt), Ni (nickel), Li (lithium), B (boron), Na (sodium), K (potassium), and Si (silicon). The ceramic layers 11 may contain oxides of two or more of these elements.

The ceramic layers 11 may contain glass containing at least one element selected from the group consisting of Co, Ni, Li, B, Na, K, and Si.

In one aspect, the thickness (the dimension in the T-axis direction) of the ceramic layers 11 is 0.2 to 10 μm.

(1-2-2) Crystal Grains

Figure 3:
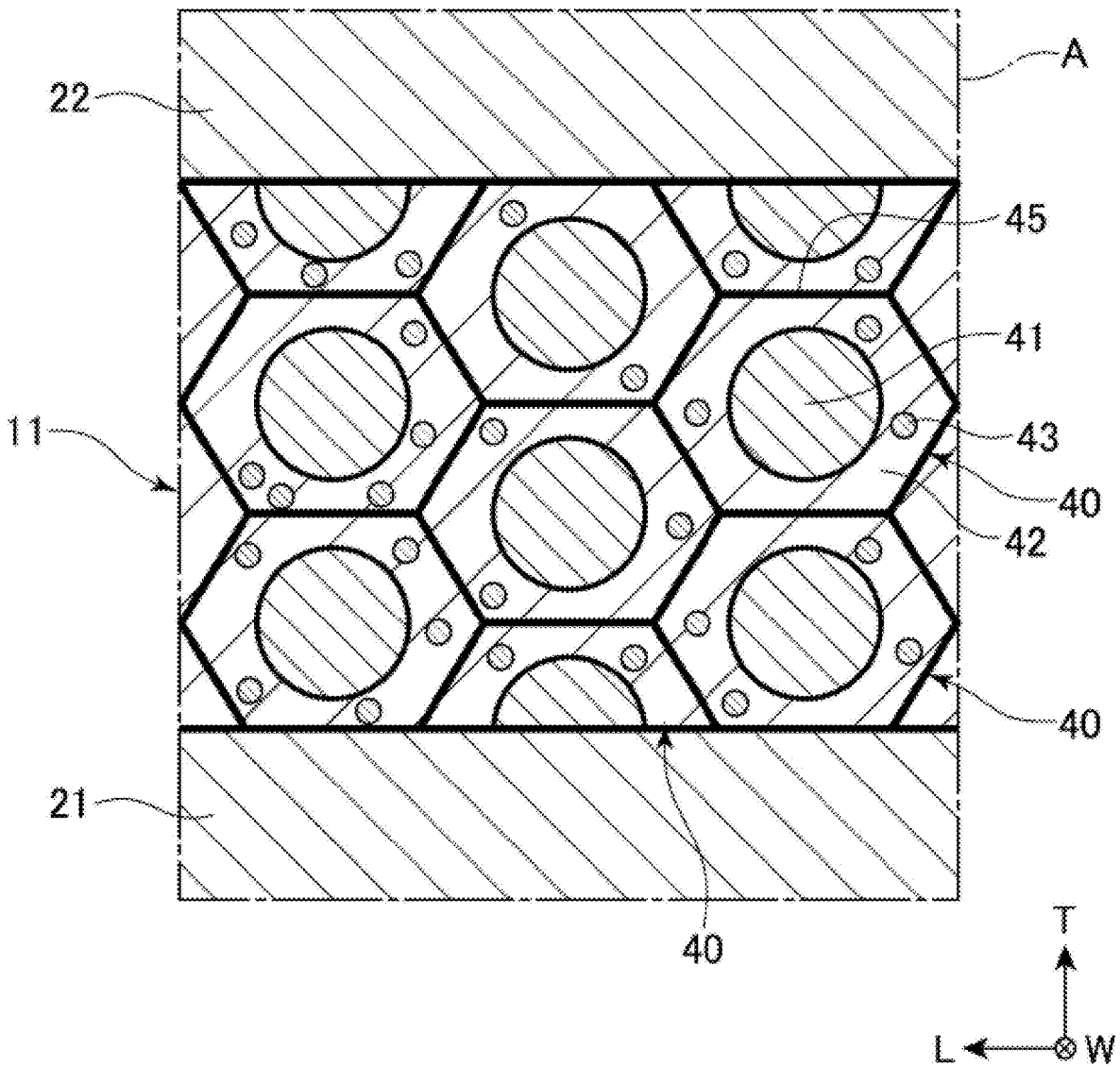
FIG. 3 is an enlarged sectional view showing, on an enlarged scale, a part (region A) of the section shown in FIG. 2.
Figure 4:
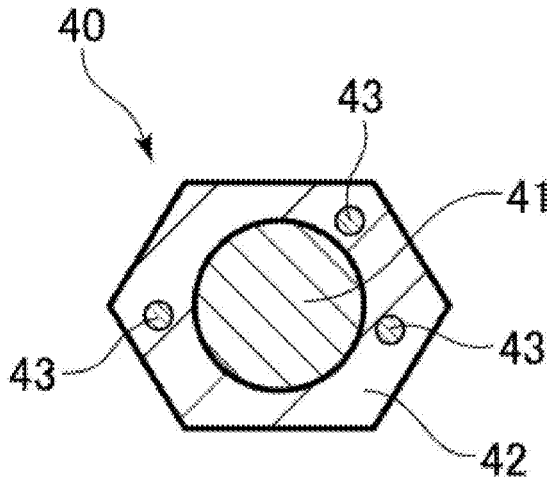
FIG. 4 is a sectional view schematically showing a section of crystal grains contained in the dielectric layer of the capacitor shown in FIG. 1.

The ceramic layers 11 contain a plurality of crystal grains of ceramic material. At least a part of the plurality of crystal grains has a core-shell structure. With further reference to FIGS. 3 and 4, a description will now be given of the crystal grains contained in the ceramic layers 11. FIG. 3 is an enlarged sectional view showing, on an enlarged scale, a region A of the section of the body 10 shown in FIG. 2, and FIG. 4 schematically shows a section of one of the crystal grains. The region A extends from a first internal electrode layer 21 through a ceramic layer 11 to a second internal electrode layer 22.

As shown in FIG. 3, the ceramic layer 11 contains a plurality of crystal grains 40. Adjacent ones of the crystal grains 40 are separated from each other by grain boundaries 45. In other words, the ceramic layer 11 is a polycrystal containing a plurality of crystal grains 40, with atoms regularly arranged, and grain boundaries 45 interposed between adjacent ones of the plurality of crystal grains 40.

As shown in FIGS. 3 and 4, the crystal grains 40 have a core-shell structure. Specifically, the crystal grains 40 having a core-shell structure includes a core portion 41 and a shell portion 42 covering the core portion 41. The crystal grains 40 are, for example, crystals of barium titanate. The elements added to the ceramic layer 11 are solid-solved more in the shell portion 42 than in the core portion 41. If, for example, rare earth elements are added to the ceramic layer 11, the concentration of the rare earth elements in the shell portion 42 is higher than the concentration of the rare earth elements in the core portion 41. With the rare earth elements contained in the shell portion 42, the laminated ceramic capacitor 1 can have an improved capacitance and high-temperature load life.

It can be confirmed as follows that a crystal grain 40 has a core portion 41 and a shell portion 42. First, a focused ion beam (FIB) system is used to take a sliced analysis sample with a thickness of about 30 to 80 nm from the laminated ceramic capacitor 1. The analysis sample is placed in a scanning transmission electron microscope (STEM) equipped with either an energy dispersive X-ray spectroscope (EDS) or a wavelength-dispersive X-ray spectroscope (WDS) to obtain a high-angle annular dark-field scanning transmission electron microscopy image (HAADF-STEM image). In this HAADF-STEM image, the region that appears darker can be identified as a core portion 41, and the region that surrounds this core portion 41 and appears brighter than the core portion 41 can be identified as a shell portion 42. Thus, the core portion 41 and the shell portion 42 can be identified by the HAADF-STEM method.

The core portion 41 and the shell portion 42 can be identified by methods other than the HAADF-STEM method. One exemplary method is to obtain a concentration map of the elements contained in the analysis sample taken from the laminated ceramic capacitor 1 and identify the core portion 41 and the shell portion 42 based on this concentration map. By way of a specific example, a sliced sample taken from the laminated ceramic capacitor 1 by the FIB is placed in the STEM equipped with the EDS and observed at a magnification of 10,000 to 150,000 to obtain a concentration map of quantitative elements in the observed area. The additive elements added to the ceramic layer 11 can be the quantitative elements. For example, the rare earth elements added to the ceramic layer 11 can be the quantitative elements. Since the concentration of additive elements (e.g., rare earth elements) in the ceramic layer 11 is higher in the shell portion 42 than in the core portion 41, the shell portion 42 can be identified as the area having a high concentration of additive elements in the concentration map obtained by the EDS.

As described above, the main component oxide of the ceramic layer 11 may have oxygen defects. When voltage is applied between the first internal electrode layer 21 and the second internal electrode layer 22, the oxygen defects in the ceramic layer 11 migrate from the inside of the ceramic layer 11 toward one of the first internal electrode layer 21 and the second internal electrode layer 22 serving as a negative electrode, and accumulate at the interface between the ceramic layer 11 and the first internal electrode layer 21 or the second internal electrode layer 22. The oxygen defects having accumulated at the interface between the ceramic layer 11 and the first internal electrode layer 21 or the second internal electrode layer 22 increase the leakage current and thus cause a decrease in the insulation reliability of the laminated ceramic capacitor 1. Therefore, the insulation reliability of the laminated ceramic capacitor 1 can be improved by inhibiting the oxygen defects occurring in the ceramic layer 11 from migrating to the first internal electrode layer 21 or the second internal electrode layer 22.

As described above, the concentration of the additive elements in the crystal grain 40 is higher in the shell portion 42 than in the core portion 41. Therefore, the insulation reliability of the laminated ceramic capacitor 1 can be efficiently improved by inhibiting the migration of oxygen defects in the shell portion 42.

In one embodiment, the shell portion 42 of each crystal grain 40 has one or more intra-shell pores 43. An intra-shell pore 43 is a void contained in the shell portion 42. Since the oxygen defects occurring in the ceramic layer 11 cannot migrate through the voids, the intra-shell pores 43 can inhibit the migration of the oxygen defects. The intra-shell pores 43, which are contained in the shell portion 42, can inhibit the migration of the oxygen defects in the shell portion 42. As the content of additive elements (e.g., rare earth elements) in the ceramic layer 11 is larger, the oxygen defects are more likely to occur in the shell portion 42. However, the intra-shell pores 43 provided in the shell portion 42 inhibit the migration of the oxygen defects occurring in the shell portion 42.

Previously, there was no known technique of selectively introducing voids in the interior of a crystal grain, particularly in the shell portion 42. In the invention disclosed herein, the intra-shell pores 43 can be introduced in the interior of the crystal grain 40, or more specifically, in the shell portion 42, thereby efficiently inhibiting the migration of the oxygen defects in the shell portion 42.

The average diameter of the intra-shell pores 43 is large enough to inhibit the migration of the oxygen defects, or more specifically, 1 nm or larger. It is believed that the intra-shell pores 43 can inhibit the migration of the oxygen defects when the diameter of the intra-shell pores 43 is larger than the lattice constant of the ceramic particles in the ceramic layer 11. Since the lattice constant of the ceramic particles contained in the ceramic layer 11 is smaller than 1 nm, the lower limit of the intra-shell pores 43 can be set to 1 nm. For example, the lattice constant of barium titanate is 0.399 nm for a-axis length and 0.404 nm for c-axis length, and thus the lower limit of the intra-shell pores 43 can be set to 1 nm, such that the migration of oxygen defects in the ceramic layer 11 can be inhibited by the intra-shell pores 43.

If the diameter of the intra-shell pores 43 is too large, moisture can easily penetrate into the intra-shell pores 43 during manufacture and use of the laminated ceramic capacitor 1, which can degrade the moisture resistance of the laminated ceramic capacitor 1. Therefore, in order to ensure the moisture resistance of the laminated ceramic capacitor 1, it is desirable to define an upper limit of the average diameter of the intra-shell pores 43. In one aspect, the average diameter of the intra-shell pores 43 is 25 nm or less.

In one aspect, the average diameter of the one or more intra-shell pores 43 can be 1 nm to 25 nm.

In addition to the average diameter of the intra-shell pores 43, the area proportion of the intra-shell pores 43 in the shell portion 42 affects the moisture resistance of the laminated ceramic capacitor 1. If the area proportion of the intra-shell pores 43 in the shell portion 42 is too large, moisture can easily penetrate into the intra-shell pores 43 during manufacture and use of the laminated ceramic capacitor 1. Therefore, in order to ensure the moisture resistance of the laminated ceramic capacitor 1, it is desirable to define an upper limit of the area proportion of the intra-shell pores 43 in the shell portion 42. In one aspect, the area proportion of the intra-shell pores 43 in the shell portion 42 is 22% or less. The area proportion of the intra-shell pores 43 that is more desirable to ensure the moisture resistance of the laminated ceramic capacitor 1 is 19% or less.

The presence of the intra-shell pores 43 in shell portion 42 can be confirmed as follows. First, a focused ion beam (FIB) system is used to take a sliced analysis sample with a thickness of 50 nm or less from the laminated ceramic capacitor 1. The thickness of the analysis sample can be, for example, 10 nm to 50 nm. The analysis sample is then placed in a transmission electron microscope (TEM) to obtain a TEM image of an observed surface of the sliced sample. Since the intra-shell pores 43 appear bright in the TEM image, the intra-shell pores 43 can be identified by binarization analysis of the TEM image. The diameters of the intra-shell pores 43 can be measured in the binarized TEM image. If the cross-section of an intra-shell pore 43 is not circular, the diameter of a circle having an area equal to the area of the intra-shell pore 43 (Haywood diameter) is taken as the diameter of the pore. When acquiring the TEM image, the acceleration voltage can be set to 200 kV.

The area proportion of the intra-shell pores 43 in the shell portion 42 is obtained by acquiring a TEM image of an observed surface of the sliced analysis sample having a thickness of 50 nm or less taken from the laminated ceramic capacitor 1, and then calculating the proportion of the total area of the intra-shell pores 43 to the total area of the shell portion 42 included in the observed area.

(1-3) First Internal Electrode Layers 21 and Second Internal Electrode Layers 22

In one aspect, the first internal electrode layers 21 contain a base metal such as Ni (nickel), Cu (copper), and Sn (tin), as the main component thereof. A component that is at least 50 wt % of the first internal electrode layers 21 with reference to the total mass of the first internal electrode layers 21 can be regarded as the main component of the first internal electrode layers 21. The first internal electrode layers 21 preferably contain 60 wt % or more, 70 wt % or more, 80 wt % or more, or 90 wt % or more the base metal as the main component thereof.

The first internal electrode layers 21 can contain secondary elements in addition to the main component metal element. The secondary elements that can be contained in the first internal electrode layers 21 are one or more elements selected from the group consisting of, for example, As (arsenic), Au (gold), Co, Cr, Cu, Fe, In (indium), Ir (iridium), Mg, Os (osmium), Pd (palladium), Pt (platinum), Re (rhenium), Rh (rhodium), Ru (ruthenium), Se (selenium), Sn, Ge (germanium), Te (tellurium), W, Y (yttrium), Zn (zinc), Ag (silver), and Mo. The main component metal element and the secondary elements are separate elements. For example, when the main component metal element is Ni, Sn can be employed as a secondary element, but when the main component metal element is Sn, Sn cannot be selected as a secondary element.

In one aspect, the internal electrode layers can contain 0.01 at % to 5 at % the secondary elements. When the internal electrode layers contain two or more elements as secondary elements, the total concentration of these two or more secondary elements is 0.01 at % to 5 at %.

The description of the components of the first internal electrode layers 21 also applies to the components of the second internal electrode layers 22.

In an aspect, the thickness (the dimension in the T-axis direction) of the first internal electrode layers 21 is 0.1 μm to 2 μm. In one aspect, the thickness of the first internal electrode layers 21 is preferably 0.4 μm or less. The description of the thickness of the first internal electrode layers 21 also applies to the thickness of the second internal electrode layers 22.

(1-4) First External Electrode 31 and Second External Electrode 32

In one aspect, the first and second external electrodes 31 and 32 are formed by applying a conductive paste to the body 10 and heating the conductive paste. The conductive paste can contain at least one substance from the group consisting of Ag, Pd, Au, Pt, Ni, Sn, Cu, W, Ti, and alloys of these.

(2) MANUFACTURING METHOD OF LAMINATED CERAMIC CAPACITOR 1

(2-1) Outline of Manufacturing Method of Laminated Ceramic Capacitor 1

Figure 5:
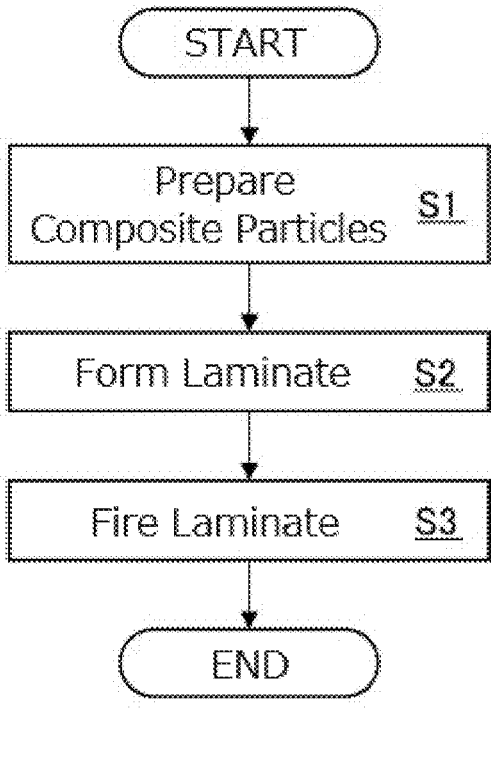
FIG. 5 is a flowchart showing a flow of a manufacturing method of a laminated ceramic capacitor according to one embodiment of the disclosure.
Figure 6:
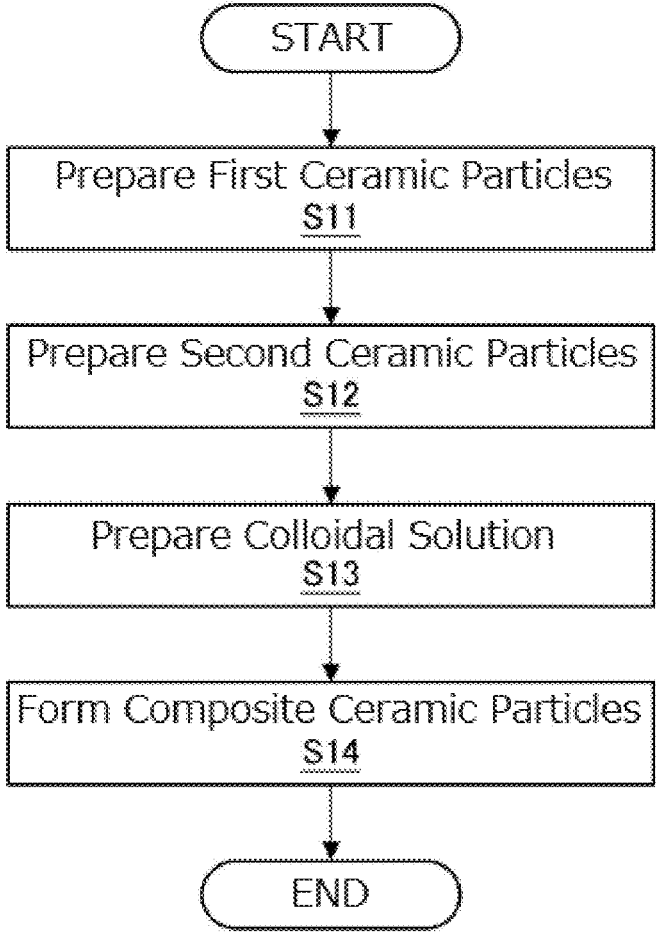
FIG. 6 is a flowchart showing a flow of a process of preparing composite ceramic particles used in the manufacturing method shown in FIG. 5.

A description will now be given of one example of the manufacturing method of the laminated ceramic capacitor 1 with reference to the flowcharts of FIGS. 5 to 6 and FIGS. 7A to 7D. FIG. 5 is a flowchart showing a flow of a manufacturing method of the laminated ceramic capacitor 1 according to one embodiment of the disclosure. FIG. 6 is a flowchart for explaining further details of the step of preparing the composite ceramic particles included in the manufacturing method shown in FIG. 5.

The manufacturing method of the laminated ceramic capacitor 1 is hereinafter briefly described with reference to FIG. 5. First, in step S1, composite ceramic particles are prepared by bonding second ceramic particles having a small diameter to the surfaces of first ceramic particles having a large diameter. The details of the preparation method of the composite ceramic particles will be described later.

Next, in step S2, a sheet laminate, which is the precursor of the body 10, is formed using the composite ceramic particles. The sheet laminate includes ceramic green sheets, which are the precursor of the ceramic layers 11, and internal conductor patterns, which are the precursor of the first and second internal electrode layers 21 and 22. The sheet laminate may be formed by alternately stacking ceramic green sheets each having an internal conductor pattern on the surface thereof which is the precursor of the first internal electrode layer 21, and ceramic green sheets each having an internal conductor pattern on the surface thereof which is the precursor of the second internal electrode layer 22.

The ceramic green sheets are prepared by wet-mixing the composite ceramic particles 60 with a binder such as polyvinyl butyral (PVB) resin, an organic solvent such as ethanol or toluene, and a plasticizer to form a slurry, coating this slurry on a substrate film using the die coater or doctor blade method, for example, and then drying the slurry coated on the substrate film.

Next, the internal electrode patterns are formed on the ceramic green sheets formed as described above. The internal electrode patterns are formed, for example, by printing a paste for the internal electrodes on the ceramic green sheets by screen printing or other known printing methods. When the internal electrode patterns are formed by screen printing, the paste for the internal electrodes is produced by kneading and mixing a metal powder, a binder resin, and a solvent by a three-roll mill. In other words, the paste for the internal electrodes is produced by dispersing a metal powder in a binder resin. The metal powder contained in the paste for the internal electrodes include powders of main component metal elements such as Ni, Cu, and Sn, which are the main components of the first internal electrode layers 21 and the second internal electrode layers 22. The organic binder used in the paste for the internal electrodes may be a cellulose-based resin such as ethyl cellulose or an acrylic resin such as butyl methacrylate. The internal electrode patterns formed on some of the ceramic green sheets are the precursor of the first internal electrode layers 21, and the internal electrode patterns formed on some others of the ceramic green sheets are the precursor of the second internal electrode layers 22. The internal electrode patterns may be formed on the ceramic green sheets by the sputtering method.

As described above, a lamination unit having a ceramic green sheet and an internal electrode pattern formed on the surface of the ceramic green sheet is obtained. A predetermined number of lamination units are stacked together and thermo-compressed to form a sheet laminate. The top layer and the bottom layer of the sheet laminate may be formed of green sheets that do not have internal electrode patterns formed thereon.

Next, the sheet laminate formed in this manner is diced into pieces to obtain chip-like laminates each being the precursor of the body 10. The chip-like laminates may be subjected to a degreasing process. The degreasing process may be performed in a nitrogen atmosphere. The laminates having undergone the degreasing process may be coated with a metal paste by the dip method to form base electrode layers for the first and second external electrodes 31 and 32.

Next, in step S3, each of the chip laminates produced in step S2 is placed in the firing furnace, and the chip laminate is fired in the firing furnace to produce the laminated ceramic capacitor 1. In this firing process, the ceramic green sheets in the chip laminate are fired to form the ceramic layers 11, and the internal electrode patterns are fired to form the internal electrode layers (the first internal electrode layers 21 and the second internal electrode layers 22).

Processes not shown in the flowchart of FIG. 5 may be performed to produce the laminated ceramic capacitor 1. For example, the laminate that has been fired in step S3 may be subjected to a reoxidation process at 600° C. to 1000° C. in a nitrogen gas atmosphere. A plating layer of Cu, Ni, Sn, etc. may be provided on the surfaces of the first and second external electrodes 31 and 32. This plating layer can be formed by the electrolytic or electroless plating method.

(2-2) Process of Preparing Composite Ceramic Particles

Next, the details of step S1 of preparing the composite ceramic particles are described with further reference to FIG. 6 and FIGS. 7A to 7D. The composite ceramic particles are composite particles containing first ceramic particles and second ceramic particles. In the following description, it is assumed that both the first and second ceramic particles are barium titanate (BaTiO₃) particles.

Figure 7A:
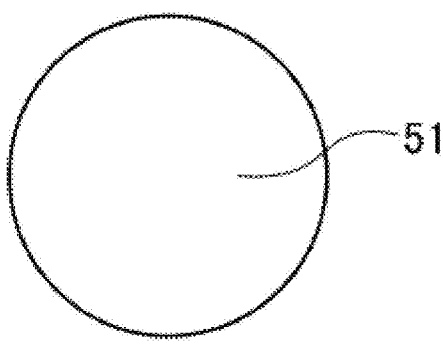
FIG. 7A is a schematic diagram illustrating a process of preparing the composite ceramic particles.

The flow of preparing the mixed ceramic powder shown in FIG. 6 starts with step S11, in which first ceramic particles 51 having a large diameter are prepared. An example of the first ceramic particles 51 is shown in FIG. 7A. The first ceramic particles 51 are formed by any known synthesis method, such as solid-phase synthesis, sol-gel synthesis, or hydrothermal synthesis. When the solid-phase synthesis method is used, the first ceramic particles 51 are formed by mixing a titanium raw material such as titanium dioxide with a barium raw material such as barium carbonate and causing a solid-phase reaction between the titanium raw material and the barium raw material. The average particle size of the first ceramic particles 51 is, for example, 50 nm to 150 nm. As will be described later, the core portions 41 of the crystal grains 40 are formed mainly of the first ceramic particles 51. The first ceramic particles 51 preferably do not contain pores, so as to inhibit degradation of dielectric properties. The first ceramic particles 51 are preferably prepared by solid-phase synthesis rather than by hydrothermal synthesis, which tends to produce pores. The first ceramic particles 51 may contain additive elements contained in the ceramic layers 11 (e.g., one or more of the metal elements such as Fe, the rare earth elements, and the other additive elements mentioned above).

Figure 7B:
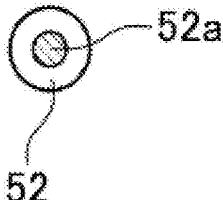
FIG. 7B is a schematic diagram illustrating a process of preparing the composite ceramic particles.

Next, in step S12, the second ceramic particles 52 having a smaller diameter than the first ceramic particles 51 are prepared. The second ceramic particles 52 may be prepared by hydrothermal synthesis. The second ceramic particles 52 are formed, for example, by hydrothermal process of titanium hydroxide and barium hydroxide. The second ceramic particles 52 have a pore 52a, as shown in FIG. 7B. The second ceramic particles 52 may have a single pore 52a or multiple pores 52a. The second ceramic particles 52 are likely to contain a pore when the raw materials are synthesized by hydrothermal synthesis to form the second ceramic particles 52. The method used to synthesize the second ceramic particles 52 is not limited to hydrothermal synthesis. The average particle size of the second ceramic particles 52 is, for example, 5 nm to 50 nm. The pores 52a will be the intra-shell pores 43 contained in the body 10 of the finished laminated ceramic capacitor 1. In the firing step S3, the barium titanate crystals may grow, resulting in the intra-shell pores 43 having a smaller diameter than the pores 52a. Therefore, the diameters of the intra-shell pores 43 can be controlled by controlling the firing conditions in the firing step S3. Specifically, the diameters of the intra-shell pores 43 can be reduced by raising the firing temperature or lengthening the firing time to promote the growth of the barium titanate crystals. In one aspect, the diameters of the pores 52a may be 1 to 30 nm. The diameters of the pores 52a may be 20 to 80% of the diameters of the second ceramic particles 52.

The second ceramic particles 52 may contain additive elements contained in the ceramic layers 11 (e.g., one or more of the metal elements such as Fe, the rare earth elements, and the other additive elements mentioned above).

Figure 7C:
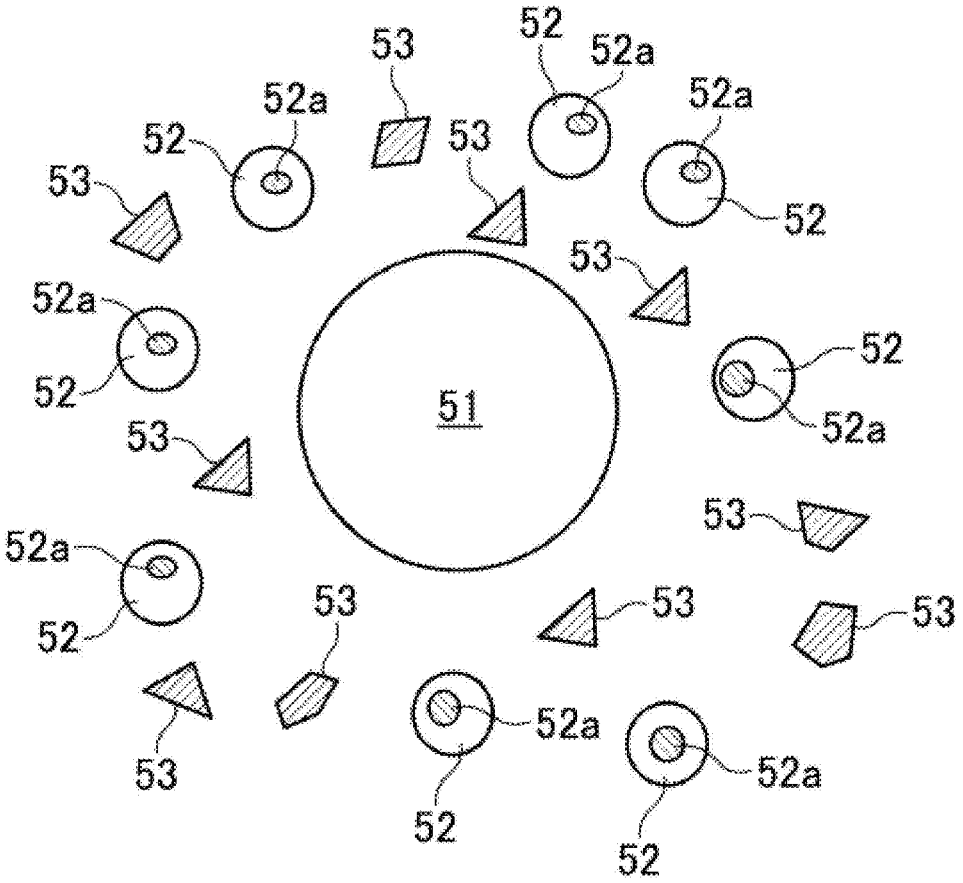
FIG. 7C is a schematic diagram illustrating a process of preparing the composite ceramic particles.
Figure 7D:
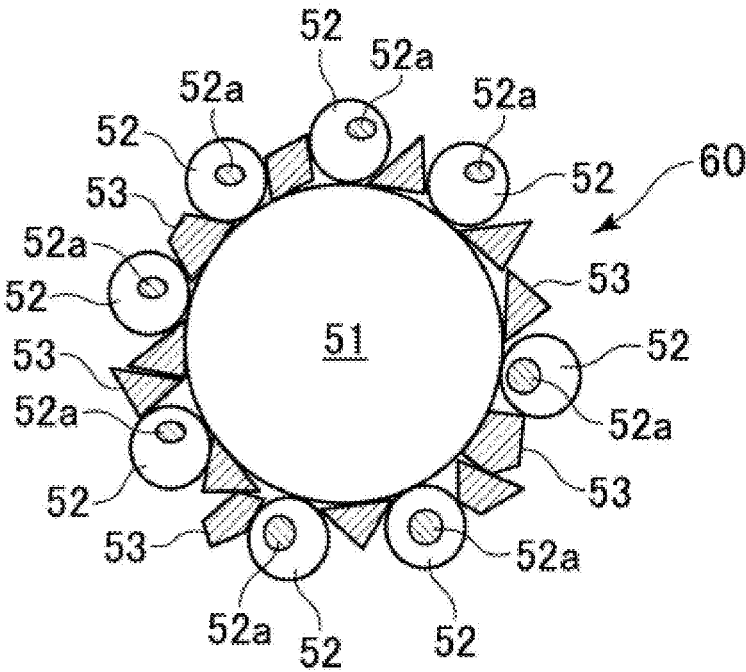
FIG. 7D is a schematic diagram illustrating a process of preparing the composite ceramic particles.

Next, in step S13, a colloidal solution is prepared by dispersing in a dispersion solution the powder of the first ceramic particles 51, the powder of the second ceramic particles 52, and the additive powder 53. In FIGS. 7C and 7D, the additive powder 53 is shown in shapes other than a circle to make it easier to distinguish the additive powder 53 from the second ceramic particles 52, but it may be formed of spherical particles. The dispersion solution may include, for example, water or ethanol solvent. The additive powder 53 is a powder containing the additive elements to be added to the ceramic layers 11. As described above, the ceramic layers 11 can contain metal elements such as Fe, rare earth elements such as Ho, and other additive elements. The additive powder 53 is the powder of the additive elements contained by the ceramic layers 11. A pH adjuster may be added to the colloidal solution, if necessary.

One or both of the first and second ceramic particles 51 and 52 may be surface-modified so that the zeta potential of the first ceramic particles 51 and the zeta potential of the second ceramic particles 52 have opposite polarities in the dispersion solution. The pH of the dispersion solution is adjusted to a predetermined range. The first ceramic particles 51 and/or the second ceramic particles 52 may be surface-modified so that the zeta potential of the first ceramic particles 51 and the zeta potential of the second ceramic particles 52 have opposite polarities in the dispersion solution having a pH in a predetermined range. In the dispersion solution, the first ceramic particles 51 having zeta potentials of the same polarity repel each other electrostatically, and the second ceramic particles 52 having zeta potentials of the same polarity also repel each other electrostatically. This inhibits agglomeration of the first ceramic particles 51 and agglomeration of the second ceramic particles 52 in the dispersion solution. Surface modification of the first ceramic particles 51 is performed, for example, by adsorbing an organic substance such as a surfactant onto the surfaces of the first ceramic particles 51. Likewise, surface modification of the second ceramic particles 52 is performed, for example, by adsorbing an organic substance such as a surfactant onto the surfaces of the second ceramic particles 52.

Next, in step S14, the colloidal solution obtained in step S13 is stirred in a mixing vessel to hetero-agglomerate the first ceramic particles 51, the second ceramic particles 52, and the additive powder 53 to form the composite ceramic particles 60. As shown in FIG. 7D, a composite ceramic particle 60 has a first ceramic particle 51, second ceramic particles 52 adsorbed on the surface of the first ceramic particle 51, and an additive powder 53 also adsorbed on the surface of the first ceramic particle 51. The first and second ceramic particles 51 and 52 attract each other electrostatically because they have zeta potentials of different polarities. Van der Waals forces also act between the first and second ceramic particles 51 and 52. The electrostatic attraction and van der Waals forces acting between the first and second ceramic particles 51 cause adsorption of the second ceramic particles 52 on the surface of the first ceramic particle 51. Since van der Waals forces also act between the first ceramic particle 51 and the additive powder 53, the additive powder 53 is also adsorbed on the surface of the first ceramic particle 51. In FIG. 7D, the additive powder 53 is shown in noncircular shapes to distinguish it from the second ceramic particles 52, but the additive powder 53 may be formed of spherical particles. In FIG. 7D, the additive powder 53 is prominently represented to show that it is added. On the surface of the first ceramic particle 51, the proportion of the second ceramic particles 52 to the additive powder 53 may be larger than shown in FIG. 7D.

The colloidal solution containing the composite ceramic particles 60 obtained as described above is filtered to separate the composite ceramic particles 60 from the dispersion solution. Next, the composite ceramic particles 60 separated are rinsed with water, and the composite ceramic particles 60 rinsed are dried to prepare a powder of the composite ceramic particles 60.

The composite ceramic particles 60 prepared in this way are used to prepare the laminated ceramic capacitor 1 according to the flow shown in FIG. 5. As a result, in the firing step S3, the barium titanate contained in the first and second ceramic particles 51 and 52 is densified to form the core portion 41. In the firing step, the additive elements contained in the additive powder 53 are solid-solved in the densified barium titanate, forming the shell portion 42 that contains a large amount of additive elements. The additive elements contained in the shell portion 42 may originate from the additive elements contained in the first ceramic particles 51 and/or the second ceramic particles 52.

In the firing step, the pores 52a in the second ceramic particles 52 form the intra-shell pores 43 in the shell portion 42. As the barium titanate contained in the second ceramic particles 52 is densified, the diameters of the intra-shell pores 43 are made smaller than the diameters of the pores 52a. However, as the barium titanate is densified, two or more pores 52a in the second ceramic particles 52 may be connected together to form one intra-shell pore 43. In this case, the diameter of the intra-shell pore 43 formed by the connection of the two or more pores 52a may be larger than each of the diameters of the two or more pores 52a connected together.

In this way, the laminated ceramic capacitor 1 can be manufactured so that the shell portion 42 of the crystal grain 40 in the ceramic layer 11 contains the intra-shell pores 43.

(3) EXAMPLES

The invention will now be further described in detail based on examples. The invention is not limited to the following examples.

Samples of the laminated ceramic capacitor 1 were manufactured according to the manufacturing method described in FIGS. 5 and 6, and the manufactured samples were tested for insulation reliability and moisture resistance.

(3-1) Preparation of Samples (3-1-1) Preparation of Sample 1

First, according to step S1, the composite ceramic particles 60 were prepared. Specifically, according to step S11, titanium dioxide and barium carbonate were synthesized by solid phase synthesis to prepare barium titanate particles (first ceramic particles 51) with an average particle size of 100 nm. Next, according to step S12, the hydrothermal process of titanium hydroxide and barium hydroxide was performed to prepare barium titanate particles (second ceramic particles 52) with an average particle size of 5 nm. Next, the first ceramic particles 51, the second ceramic particles 52, and the additive powder 53 containing Ho were taken at the proportion of 100 wt %, 2 wt %, and 2 wt %, respectively. The powder of the first ceramic particles 51, the powder of the second ceramic particles 52, and the additive powder 53 were added to a mixed solution to prepare the colloidal solution. The mixed solution included 150 ml of water. The colloidal solution was stirred for a period long enough to allow the first ceramic particles 51, the second ceramic particles 52, and the additive powder to hetero-agglomerate. Next, the colloidal solution was filtered to separate the composite ceramic particles 60 from the dispersion solution. The composite ceramic particles 60 separated were rinsed with water, and the composite ceramic particles 60 rinsed were dried to prepare a powder of the composite ceramic particles 60.

Next, according to step S2, the laminate was formed. Specifically, polyvinyl butyral (PVB) resin, toluene, and a plasticizer were added to the composite ceramic particles 60 for wet mixture to form a slurry. The slurry was then coated onto base films by the doctor-blade method, and the slurry coated onto the base films was then dried to prepare ceramic green sheets. Next, a slurry for internal electrodes was printed on a part of the surfaces of the ceramic green sheets formed as described above, to form an internal electrode pattern on each of the ceramic green sheets. This lamination unit has the ceramic green sheet and the internal electrode pattern formed on the surface of the ceramic green sheet. Next, 250 laminated units were stacked together to form a sheet laminate, which was then diced into chip laminates. The chip laminates had the 0603 shape (length: 0.6 mm, width: 0.3 mm, height: 0.3 mm). Next, the chip laminates were degreased in an $N_2$ atmosphere. Next, the base layers of the external electrodes were formed on each of the chip laminates by applying metal paste to the degreased compact by the dip method.

Next, the chip laminates obtained as described above were put into the firing furnace, and the chip laminates were fired according to a predetermined temperature profile and under predetermined firing conditions. Specifically, in a low-oxygen atmosphere with an oxygen partial pressure of $7.8 \times 10^{-8}$ atm, the temperature inside the firing furnace was increased from the room temperature to 600° C. at a rate of 300° C./h, and then increased from 600° C. to 1300° C. at a rate of 30,000° C./h. Cooling was started immediately after the temperature reached 1300° C. The chip laminates were fired in this temperature profile.

This firing process produced the laminated ceramic capacitor of sample 1 shown in Table 1 below. In this laminated ceramic capacitor, the ceramic green sheets were fired to form the dielectric layers, and the internal electrode patterns were fired to form the internal electrode layers. The base layers formed on the compact were fired to form the external electrodes.

(3-1-2) Preparation of Samples 2 to 4

According to step S11, the same barium titanate particles having an average particle size of 100 nm as those used in the preparation of sample 1 were prepared as the first ceramic particles 51. According to step S12, the same barium titanate particles as those used in the preparation of sample 1 were also prepared as the second ceramic particles 52. The first ceramic particles 51 and the second ceramic particles 52 were taken at the proportions for samples 2 to 4 shown in Table 1 and used for preparing three types of composite ceramic particles 60. These three types of composite ceramic particles 60 were used to form laminates by the same process as for sample 1, and the laminates were fired to prepare samples 2 to 4.

(3-1-3) Preparation of Samples 5 to 6

According to step S11, the same barium titanate particles having an average particle size of 100 nm as those used in the preparation of sample 1 were prepared as the first ceramic particles 51. According to step S12, the hydrothermal process of titanium hydroxide and barium hydroxide was performed to prepare barium titanate particles with an average particle size of 20 nm as the second ceramic particles 52. The first ceramic particles 51 and the second ceramic particles 52 were taken at the proportions for samples 5 to 6 shown in Table 1 and used for preparing two types of composite ceramic particles 60. These two types of composite ceramic particles 60 were used to form laminates by the same process as for sample 1, and the laminates were fired to prepare samples 5 to 6.

(3-1-4) Preparation of Samples 7 to 9

According to step S11, the same barium titanate particles having an average particle size of 100 nm as those used in the preparation of sample 1 were prepared as the first ceramic particles 51. According to step S12, the hydrothermal process of titanium hydroxide and barium hydroxide was performed to prepare barium titanate particles with an average particle size of 50 nm as the second ceramic particles 52. The first ceramic particles 51 and the second ceramic particles 52 were taken at the proportions for samples 7 to 9 shown in Table 1 and used for preparing three types of composite ceramic particles 60. These three types of composite ceramic particles 60 were used to form laminates by the same process as for sample 1, and the laminates were fired to prepare samples 7 to 9.

(3-1-5) Preparation of Sample 10 (Comparative Example)

According to step S11, the same barium titanate particles having an average particle size of 100 nm as those used in the preparation of sample 1 were prepared. These barium titanate particles were used to form laminates by the same process as for sample 1, and the laminates were fired to prepare sample 10. In other words, sample 10 was prepared without the second ceramic particles 52, which are prepared by hydrothermal synthesis.

(3-2) Thicknesses of Ceramic Layers and Internal Electrode Layers

The thicknesses of the dielectric layers and the internal electrode layers in sample 1, prepared as described above, were determined as follows. First, sample 1 was encapsulated in a resin, and each sample encapsulated in the resin was polished along a plane parallel to the lamination direction (e.g., the LT plane in FIG. 2) to expose a cross section parallel to the lamination direction. Next, an observation area was identified in the exposed cross section of each sample using a field emission scanning secondary electron microscope (FE-SEM) at a magnification of 5,000 to 20,000 times, and the cross section of each sample was observed in this observation area. Focusing on ten ceramic layers 11 and internal electrode layers 21 and 22 within the observation area, the dimension of these ten ceramic layers 11 in the T-axis direction was measured, and the average of these measured dimensions of the ten ceramic layers 11 in the T-axis direction can be taken as the thickness of the ceramic layers 11. Similarly, the dimensions of a total of ten internal electrode layers 21 and 22 in the T-axis direction were measured, and the averages of these measured dimensions of the ten first and second internal electrode layers 21 and 22 in the T-axis direction can be taken as the thicknesses of the first and second internal electrode layers 21 and 22, respectively. The average thicknesses of the ceramic layers 11, the first internal electrode layers 21, and the second internal electrode layers 22, determined in this way, were all approximately 0.5 μm. For samples 2 to 10, the thicknesses of the ceramic layers 11 and the internal electrode layers 21 and 22 were determined in the same manner as for sample 1. As a result, in samples 2 to 10, the average thicknesses of the ceramic layers 11, the first internal electrode layers 21, and the second internal electrode layers 22 were also all approximately 0.5 μm.

(3-3) Observation of Intra-Shell Pores and Measurement of Pore Diameter

From the laminated ceramic capacitor of sample 1, a sliced analysis sample with a thickness of 50 nm or less was taken by FIB, with its LT surface forming the observation surface. The sliced sample was then placed in a TEM (TEM JEM-ARM200F from JEOL Ltd.), and the core portion 41 and the shell portion 42 were identified by the HAADF-STEM method. Next, the shell portion 42 in the observation surface of the analysis sample in the TEM was observed at a magnification of 500,000 times, and a TEM image of this observation area was obtained. The acceleration voltage of the TEM during the observation was 200 kV. This TEM image was binarized to obtain a binarized TEM image. In this binarized TEM image, the areas within the shell portion 42 that appear white were identified as the intra-shell pores 43. Also, the diameter of each of the intra-shell pores 43 in the binarized TEM image was measured, and the average of these measured diameters was taken as the average pore diameter of the intra-shell pores 43 in sample 1 and entered in the "Average Pore Diameter" column in Table 1.

The same method was used for samples 2 to 9 to determine the average diameters of the intra-shell pores 43, and the average pore diameters obtained for these samples were entered in Table 1. For sample 10, no pores were observed in the shell portions. The intra-shell pores 43 that are present in the shell portions 42 in samples 1 to 9 originate from the pores contained in the second ceramic particles 52 that were mixed during the manufacturing process of each sample. Since the second ceramic particles 52 were not mixed for the manufacture of sample 10, there are no pores in the shell portions in sample 10.

(3-4) Calculation of Pore Area Proportion

For each of samples 1 to 9, the total area of the shell portions 42 and the total area of the intra-shell pores 43 contained in the observation area were determined in the binarized TEM image used to determine the average pore diameter, and the proportion of the area of the intra-shell pores 43 to the total area of the shell portions 42 was calculated. The calculated area proportion was entered in the "Pore Area Proportion" column of Table 1. The pore area proportion for sample 10 was not calculated because there were no intra-shell pores in sample 10.

(3-5) Accelerated Life Test

Next, ten samples were selected for each of samples 1 to 10, and an accelerated life test (HALT) was performed on each of these selected samples. In the accelerated life test, for each of samples 1 to 10, the life of each of the ten selected samples was determined while a voltage of 15 V/μm was applied under 120° C., and the average failure time was calculated by averaging the lives determined for these ten samples. The average failure time for each sample calculated in this way is shown in the "Life" column of Table 1.

(3-6) Moisture Resistance Test

Moisture resistance test was performed on each of samples 1 to 10. Specifically, for each of samples 1 to 10, 1000 samples were selected and subjected to a moisture resistance test under the following conditions: test temperature=85° C., relative humidity=85% RH, applied voltage=10 Vdc (direct current), and time=1000 hours, after which the samples were immediately taken out of the moisture resistance chamber and returned to the room temperature, where the resistance value of each sample was measured. Samples having a resistance value less than 25 MΩ were determined to be defective in moisture resistance, and the defective fraction was examined. The defective fractions from the moisture resistance test examined in this manner are shown in the "Moisture Resistance Test" column of Table 1. The results of the moisture resistance test showed that the defective fractions were 0.50% or less for all of samples 1 to 9. Samples 1 to 3 and samples 5 to 7 had particularly excellent moisture resistance with a defective fraction of 0%.

TABLE 1

| Sample No. | Average Diameter of Particles 52 | Proportion of Particles 52 | Average Pore Diameter | Pore Area Proportion | Life | Moisture Resistance Test |
|---|---|---|---|---|---|---|
| 1 | 5 nm | 2% | 3 nm | 5% | 121 min | 0/1000 |
| 2 | 5 nm | 10% | 4 nm | 9% | 135 min | 0/1000 |
| 3 | 5 nm | 15% | 5 nm | 15% | 119 min | 0/1000 |
| 4 | 5 nm | 20% | 3 nm | 22% | 95 min | 5/1000 |
| 5 | 20 nm | 15% | 12 nm | 13% | 140 min | 0/1000 |
| 6 | 20 nm | 20% | 15 nm | 19% | 110 min | 0/1000 |
| 7 | 50 nm | 8% | 20 nm | 8% | 108 min | 0/1000 |
| 8 | 50 nm | 10% | 23 nm | 10% | 98 min | 4/1000 |
| 9 | 50 nm | 15% | 25 nm | 16% | 89 min | 7/1000 |
| 10(*) | N/A | N/A | N/A | N/A | 45 min | 1/1000 |

In Table 1, the sample not encompassed by the present invention (i.e., comparative example) has an asterisk (*) added to the sample number. Specifically, sample 10 is a comparative example not encompassed by the present invention.

(3-7) Analysis of Examples

The above results show that samples 1 to 9, which have intra-shell pores 43 in the shell portions 42 of the crystal grains 40 contained in the ceramic layers 11, have approximately two or more times as long as the life of sample 10 (comparative example), which does not have intra-shell pores. Therefore, samples 1 to 9 have an excellent insulation reliability. The excellent insulation reliability of samples 1 to 9 is considered to be obtained because the intra-shell pores 43 inhibits the migration of oxygen defects occurring in the shell portions 42 and thus inhibits the accumulation of the oxygen defects at the interfaces between the dielectric layers and the internal electrode layers.

The results of the moisture resistance test show that the defective fraction begins to increase as the average pore diameter increases above 23 nm. The defective fraction in sample 9 (0.7%) with an average pore diameter of 25 nm is worse than the defective fraction in sample 8 (0.5%) with an average pore diameter of 23 nm. The reason why the defective fraction in the moisture resistance test worsens as the average pore diameter increases is considered to be that as the average pore diameter increases, moisture can easily penetrate into the body 10 from the outside of the body 10 through the intra-shell pores 43 having a large diameter. Therefore, it is desirable to set an upper limit of the average diameter of the intra-shell pores 43 in order to maintain the moisture resistance of the laminated ceramic capacitor. The upper limit of the average diameter of the intra-shell pores 43 is preferably 25 nm. The upper limit of the average diameter of the intra-shell pores 43 is more preferably 23 nm.

In samples 1 to 4, in which the average diameter of the intra-shell pores 43 is 5 nm or less, the defective fraction in the moisture resistance test worsens as the pore area proportion increases. Specifically, comparing the defective fractions of samples 1 to 4, all having an average diameter of the intra-shell pores 43 of 5 nm, the defective fraction is 0% for samples 1 to 3, in which the pore area proportion is distributed in the range of 5% to 15%, while the defective fraction is 5% for sample 4, in which the pore area proportion is 22%. This result shows that even when the average diameter of the intra-shell pores 43 is as small as 5 nm or less, an increase in the pore area proportion makes it easier for moisture to penetrate into the body 10 and reduces the moisture resistance of the laminated ceramic capacitor. Therefore, it is desirable to set an upper limit of the pore area proportion. When the average pore diameter is 5 nm or less, the upper limit of the pore area proportion is preferably 22%. This reduces the defective fraction resulting from the moisture resistance test to 5% or less. When the average pore diameter is 5 nm or less, it is even more desirable to set the upper limit of the pore area proportion to 15%.

(4) NOTES

The dimensions, materials, and arrangements of the constituent elements described for the above various embodiments are not limited to those explicitly described for the embodiments, and these constituent elements can be modified to have any dimensions, materials, and arrangements within the scope of the present invention.

Constituent elements not explicitly described herein can also be added to the above-described embodiments, and it is also possible to omit some of the constituent elements described for the embodiments.

The words "first," "second," "third" and so on used herein are added to distinguish constituent elements but do not necessarily limit the numbers, orders, or contents of the constituent elements. The numbers added to distinguish constituent elements should be construed in each context. The same numbers do not necessarily denote the same constituent elements among the contexts. The use of numbers to identify constituent elements does not prevent the constituent elements from performing the functions of the constituent elements identified by other numbers.

The expression of "including" a constituent element used herein does not exclude other constituent elements but rather means that other constituent elements can be further included, as long as they are consistent with the invention.

(5) ADDITIONAL EMBODIMENTS

Embodiments disclosed herein also include the following.

Additional Embodiment 1

A laminated ceramic capacitor, comprising:
a body having a first internal electrode layer, a second internal electrode layer, and a ceramic layer disposed between the first internal electrode layer and the second internal electrode layer and containing crystal grains of ceramic material;

a first external electrode provided on the body so as to be electrically connected to the first internal electrode layer; and a second external electrode provided on the body so as to be electrically connected to the second internal electrode layer, wherein the crystal grains each include a core portion and a shell portion covering the core portion, and wherein the shell portion includes one or more intra-shell pores.

Additional Embodiment 2

The laminated ceramic capacitor of Additional Embodiment 1, wherein an average diameter of the one or more intra-shell pores is 1 nm or more.

Additional Embodiment 3

The laminated ceramic capacitor of Additional Embodiment 1 or 2, wherein an average diameter of the one or more intra-shell pores is 25 nm or less.

Additional Embodiment 4

The laminated ceramic capacitor of any one of Additional Embodiments 1 to 3, wherein an average diameter of the one or more intra-shell pores is 5 nm or less, and wherein in a cross section of the body, an area proportion of the one or more intra-shell pores in the shell portion is 22% or less.

Additional Embodiment 5

The laminated ceramic capacitor of any one of Additional Embodiments 1 to 4, wherein the ceramic material is barium titanate.

Additional Embodiment 6

The laminated ceramic capacitor of any one of Additional Embodiments 1 to 5, wherein the shell portion contains a rare earth element.

Additional Embodiment 7

A circuit module comprising the laminated ceramic capacitor of any one of Additional Embodiments 1 to 6.

Additional Embodiment 8

An electronic device comprising the circuit module of Additional Embodiment 7.

Additional Embodiment 9

A method of manufacturing a laminated ceramic capacitor, the method comprising:

a powder preparation step of preparing composite ceramic particles, the composite ceramic particles including a first ceramic particle and a plurality of second ceramic particles adhered to a surface of the first ceramic particle, each of the plurality of second ceramic particles having a smaller diameter than the first ceramic particle and having one or more intra-particle pores;

a step of forming a laminate, the laminate including a ceramic green sheet and internal electrode patterns, the ceramic green sheet containing the composite ceramic particles, the internal electrode patterns being provided on a first surface and a second surface of the ceramic green sheet; and a step of firing the laminate.

Additional Embodiment 10

The method of manufacturing a laminated ceramic capacitor according to Additional Embodiment 9, wherein the powder preparation step includes preparing the plurality of second ceramic particles by hydrothermal synthesis.

Additional Embodiment 11

The method of manufacturing a laminated ceramic capacitor according to Additional Embodiment 9 or 10, wherein the powder preparation step includes preparing the first ceramic particle by solid phase synthesis.

What is claimed is:

1. A laminated ceramic capacitor, comprising:

a body having a first internal electrode layer, a second internal electrode layer, and a ceramic layer disposed between the first internal electrode layer and the second internal electrode layer and containing crystal grains of ceramic material;

a first external electrode provided on the body so as to be electrically connected to the first internal electrode layer; and a second external electrode provided on the body so as to be electrically connected to the second internal electrode layer, wherein the crystal grains each include a core portion and a shell portion covering the core portion, and wherein the shell portion includes one or more intra-shell pores, wherein an average diameter of the one or more intra-shell pores is 5 nm or less, and wherein in a cross section of the body, an area proportion of the one or more intra-shell pores in the shell portion is 22% or less.

2. The laminated ceramic capacitor of claim 1, wherein an average diameter of the one or more intra-shell pores is 1 nm or more.

3. The laminated ceramic capacitor of claim 1, wherein the ceramic material is barium titanate.

4. The laminated ceramic capacitor of claim 1, wherein the shell portion contains a rare earth element.

5. A circuit module comprising the laminated ceramic capacitor of claim 1.

6. An electronic device comprising the circuit module of claim 5.

* * * * *